United States Patent [19]

Parsons

[11] Patent Number: 4,735,186
[45] Date of Patent: Apr. 5, 1988

[54] INTERNAL COMBUSTION ENGINE AND A METHOD OF OPERATING THE ENGINE

[75] Inventor: Bryan N. V. Parsons, Stoney Stanton, United Kingdom

[73] Assignee: Jaguar Cars Limited, Allesley, England

[21] Appl. No.: 720,356

[22] Filed: Apr. 5, 1985

[30] Foreign Application Priority Data

Apr. 7, 1984 [GB] United Kingdom ............... 8409060

[51] Int. Cl.[4] ........................................... F02M 25/06
[52] U.S. Cl. ................................... 123/568; 123/3; 123/433; 123/315; 123/570
[58] Field of Search ................. 123/3, 1 A, 315, 433, 123/568, 570, 551

[56] References Cited

U.S. PATENT DOCUMENTS

| 1,629,327 | 5/1927 | Waldo | 123/433 X |
| 2,578,147 | 12/1951 | Nims | 123/551 |
| 3,416,503 | 12/1968 | High | 123/568 X |
| 3,635,200 | 1/1972 | Rundell et al. | 123/3 |
| 3,709,203 | 1/1973 | Cettin et al. | 123/3 X |
| 4,131,095 | 12/1978 | Ouchi | 123/3 X |
| 4,553,519 | 11/1985 | Masson | 123/568 X |

FOREIGN PATENT DOCUMENTS

| 0770814 | 3/1957 | United Kingdom . |
| 1328294 | 8/1973 | United Kingdom . |
| 1402207 | 8/1975 | United Kingdom . |
| 1461090 | 1/1977 | United Kingdom . |
| 1480879 | 7/1977 | United Kingdom . |
| 1489704 | 10/1977 | United Kingdom . |
| 1595812 | 8/1981 | United Kingdom . |

*Primary Examiner*—Willis R. Wolfe, Jr.
*Attorney, Agent, or Firm*—Solon B. Kemon

[57] ABSTRACT

An internal combustion engine, and a method of operating an internal combustion engine, of the kind in which recycled exhaust gases are reacted with a hydrocarbon fuel in a combustion space to produce a reformed fuel of enhanced calorific value by cracking molecules of the hydrocarbon fuel, the invention providing for means for the supply of air to the combustion space in the cylinder and separate means for the supply of the cracked and reformed fuel enabling an efficient engine operation to be achieved with economical use of fuel.

23 Claims, 3 Drawing Sheets

INTERNAL COMBUSTION ENGINE AND A METHOD OF OPERATING THE ENGINE

BACKGROUND OF THE INVENTION

This invention relates to an internal combustion engine and to a method of operating the engine.

A method of operating an internal combustion engine is known in which thermal energy of exhaust gas produced by the engine is used to run a steam reforming reaction whereby a fuel such as petrol or methanol is reformed by reacting it with steam to produce a fuel of higher calorific value. The water used in this reaction has been condensed from the exhaust gas or supplied from a reservoir of water. However, the know methods require the use of a number of heat exchangers and difficulty has been experienced in fitting all the required components under the bonnet of a conventional vehicle. Catalytic cracking and reforming of the fuel by exhaust gas heat is also known. Moreover supply of air and reformed fuel to an engine has been described wherein a single common cylinder supply port is utilised.

SUMMARY OF THE INVENTION

According to a first aspect of this invention, there is provided a method of operating an internal combustion engine including the steps of recycling at least a portion of the exhaust gas produced in an engine cylinder combustion chamber, reacting the recycled exhaust gas with a hydrocarbon fuel to produce a reformed fuel by cracking molecules of the hydrocarbon fuel characterised in that during an induction stroke an air supply is fed to the cylinder combustion chamber separately from a supply of the reformed fuel.

The invention also includes a method as described in the preceding paragraph wherein the reformed fuel supply is fed through the head end of the cylinder into the combustion chamber during the induction stroke, but, in an alternative method while the air supply is fed through the head end of the cylinder the reformed fuel supply is fed through the lower part of the cylinder into the combustion chamber.

In the method according to the invention the timing of the supply of air and the supply of the reformed fuel is arranged so that at least part of the air is supplied before the supply of reformed fuel for each supply operation. In one form of operation no separate air is supplied after the commencement of the supply of reformed fuel. The reformed fuel may be under sufficient pressure, e.g. 25 to 100 lbs per square inch, from the exhaust gas supply, but it may be pressure-charged into the engine e.g. by turbocharging or supercharging.

In regard to the exhausting of gas from a cylinder, according to the invention the method includes causing the gas to flow partly through one cylinder port to extract gas for recycling and the remainder being extracted by operation of a separate cylinder exhaust port. The exhaust gas may be caused to flow through an exhaust duct leading from the cylinder wherein the flow is restricted for at least part of an exhaust stroke and the gas is then withdrawn during restriction to supply it for recycling. The exhaust gas may be divided between two exhaust ducts, exhaust from one duct being recycled while exhaust from the other duct is rejected to atmosphere. Where a plurality of cylinders is provided in an engine according to the invention the method may involve the supply of air separate from a supply of reformed fuel to some only of the cylinders. Some only of the cylinders may be supplied with unreacted (untreated) fuels. In addition, exhaust gas may be taken from less than all of the cylinders instead of from them all, the remainder discharging to atmosphere.

According to a second aspect of this invention, there is provided an internal combustion engine having a cylinder, a reaction chamber for receiving a supply of hydrocarbon fuel and means for supplying exhaust gas from the cylinder combustion space to the reaction chamber to enable a reaction to take place therein to produce a cracked and reformed hydrocarbon fuel characterised in that the cylinder is provided with means for the supply of air to the combustion space and separate means for the supply thereto of cracked and reformed hydrocarbon fuel from the reaction chamber.

References in this specification to hydrocarbon fuel should be understood to include all fuels based on carbon which at least some hydrogen. The fuel may comprise aliphatic, alicyclic and/or aromatic compounds. The fuel may comprise relatively small molecules such as methane ($CH_4$), methanol ($CH_3OH$), and benzene ($C_6H_6$) or may comprise relatively large molecules such as decane ($C_{10}H_{22}$) and the larger molecules found in bunker fuel oil and waxes. Preferred features of the invention will be apparent from the subsidiary claims of the specification.

BRIEF DESCRIPTION OF THE DRAWINGS

The invention will now be described, merely by way of example, with reference to the accompanying drawings, in which.

DESCRIPTION OF A PREFERRED EMBODIMENT

Figure 1:
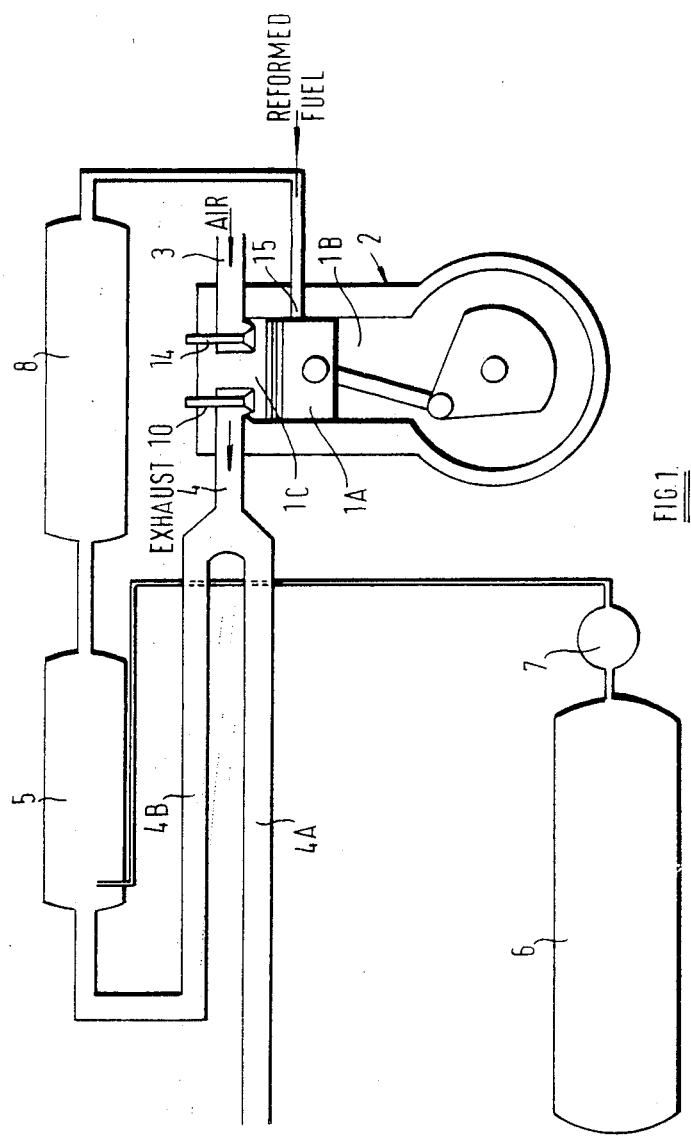
FIG. 1 schematically illustrates a first arrangement of an internal combustion engine according to this invention.

FIG. 1 shows a piston 1A of a reciprocating spark ignition internal combustion engine 2 in a cylinder 1B, the cylinder 1B being connected to an air inlet manifold 3 controlled by a valve 14, a reformed fuel inlet manifold means 15 and an exhaust manifold 4 controlled by means of a valve 10. The exhaust manifold divides into two ducts, the first duct 4A leading to the atmosphere and the second duct 4B leading to a reactor 5, in this instance, a catalytic cracker. The reactor 5 is also connected to a fuel tank 6 via a pump 7. Exhaust gas entering the second duct 4B is recycled to the reactor 5 and reacts with fuel to produce a reformed fuel by cracking molecules of the fuel in a known manner as will be described below. The reformed fuel is supplied to the cylinder through inlet manifold means 15, via a gas cooler 8 and air is supplied to the cylinder separately through the inlet manifold 3 controlled by the valve 14. When the piston 1A moves downwardly during the induction stroke, the means 15, which constitutes a port, is uncovered to allow the flow of reformed fuel to enter the combustion space 1C, to mix with the air already drawn in through opened valve 14, and subsequently to be burnt as a mixture to drive the engine 2.

The fuel used in the engine may, for instance, be petrol which typically comprises hydrocarbons with a hydrogen to carbon ratio of approximately 2:1. Such fuel can be represented by the molecular formula $C_nH_{2n}$, where n denotes the number of carbon atoms in the molecule.

The burning of this fuel in air can be represented by the reaction:

$$(2C_nH_{2n}) + (3nO_2 + 12nN_2) \longrightarrow (2nCO_2 + 2nH_2O + 12nN_2)$$
fuel      air      exhaust gas This reaction is exothermic and with n=10 has a lower calorific value of 6.16 MJ, ignoring the latent heat of steam. This reaction represents the burning of a fuel such as petrol in an engine in a conventional manner.

However, the fuel can be reformed by reacting it with $CO_2$ and $H_2O$ and this can be represented by the following endothermic reaction:

$$2C_nH_{2n} + nCO_2 + nH_2O \rightarrow 3nCO + 3nH_2$$

The reformed fuel comprising CO and $H_2$ thus has a higher calorific value than the unreformed fuel. This is shown by burning the reformed fuel in air which can be represented by the reaction:

$$(3nCO + 3nH_2) + (3nO_2 + 12nN_2) \longrightarrow$$
reformed fuel      air $$(3nCO_2 + 3nH_2O + 12nN_2)$$
exhaust gas This reaction is exothermic and with n=10 has a lower calorific value of 7.53 MJ, ignoring the latent heat of steam, which is approximately 20% higher than that of the reaction described above when the unreformed fuel is burnt in air. The reforming reaction occurs in the reactor 5, the $CO_2$ and $H_2O$ required for reforming the fuel being obtained from the exhaust gas produced by burning the reformed fuel. The operation of the engine can thus be represented by the following reactions:

$$(2C_nH_{2n}) + (nCO_2 + nH_2O + 6nN_2) \longrightarrow \quad (1)$$
fuel      recycled exhaust gas $$(3nCO + 3nH_2 + 6nN_2)$$
reformed fuel $$(3nCO + 3nH_2 + 6nN_2) + (3nO_2 + 16nN_2) \longrightarrow \quad (2)$$
reformed fuel      air $$(3nCO_2 + 3nH_2O + 18nN_2)$$
exhaust gas From these generalised reactions, it can be seen that in ideal conditions only one third of the exhaust gas produced by burning reformed fuel is required to be recycled to reform the fuel. The reactions given above assume that the ratio of nitrogen to oxygen in air is 4:1 and that these are the only constituents. In practice more than one third of the exhaust gas, e.g., one half, is utilised to give an excess quantity to ensure an efficient reaction.

If the fuel used had a lower hydrogen to carbon ratio, a higher proportion of the exhaust gas would need to be recycled. If excess exhaust gas is recycled then the reformed fuel would be diluted by $H_2O$, $CO_2$ and $N_2$ and hence have a lower calorific value. If insufficient exhaust gas is recycled then $CH_4$ will form and this can be represented by the reaction:

$$(10C_nH_{2n}) + (3nCO_2 + 3nH_2O + 18nN_2) \longrightarrow \quad (3)$$
fuel      recycled exhaust gas $$(9CO + 4CH_4 + 5H_2 + 18N_2)$$
reformed fuel The reactions given above are only representative of the overall changes during the burning and reforming of the fuel and in reality may be the summation of many competing reactions such as:

$$C_nH_{2n} \rightarrow nC + nH_2$$

$$C + CO_2 \rightarrow 2CO$$

$$C + H_2O \rightarrow CO + H_2$$

$$C + 2H_2O \rightarrow 2H_2 + CO_2$$

$$2C + 2H_2O \rightarrow CH_4 + CO_2$$

$$C + 2H_2 \rightarrow CH_4$$

$$CO + H_2O \rightarrow CO_2 + H_2$$

$$CO + 3H_2 \rightarrow CH_4 + H_2O$$

$$CO_2 + 4H_2 \rightarrow CH_4 + 2H_2O$$

Both of reactions (1) and (3) are endothermic and require high temperatures to ensure a fast reaction time and completion of the reaction. The exhaust gas recycled from the engine is provided to the reactor 5 at high temperature (and at in some instances high pressure) and the thermal energy of the exhaust gas is sufficient to drive the reactions. It can thus be seen that the increased calorific value of the reformed fuel is obtained by absorbing thermal energy from the recycled exhaust gas, the fuel molecules being cracked by reaction with the recycled exhaust gas. By considering the thermodynamics of the various reactions occurring in the reactor 5, it can be shown that a high proportion of CO and $H_2$ are produced if the reaction occurs at a temperature above 750° C. Preferably, a catalyst is used in the reactor 5 to promote reaction (1), for instance a highly active metallic nickel surface on a ceramic honeycomb base.

The 2:1 hydrogen to carbon ratio referred to above corresponds to petrol commonly used in motor vehicles The ratio may, however, vary widely, for instance from 4:1 if the fuel used comprises methane to 1:1 if the fuel comprises benzene.

A spark ignition engine can be arranged in a number of ways to operate with a reactor 5 as described above. The engine can be designed in a conventional manner but provision is required for recycling a proportion of the exhaust gas to the reactor and for the supply of the reformed fuel and air.

Four different methods of dividing the exhaust gas will be described;

(1) Direct Porting

Figure 2:
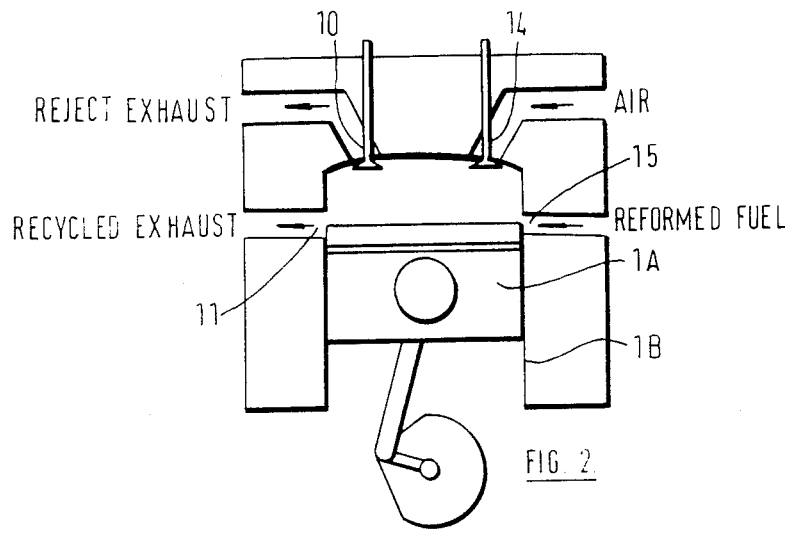
FIGS. 2 and 3 show preferred arrangements for dividing the exhaust gas produced by an internal combustion engine according to this invention.

Each piston, or at least some of the pistons, of the engine are provided with two exhaust means, the first means operating to extract exhaust gas to be rejected to the atmosphere, and the second means operating to extract exhaust gas to be recycled. The two ports may be operated at different times during the exhaust stroke. One method and construction will be described with reference to FIG. 2. It is to provide a conventional exhaust poppet valve 10 and port in the combustion chamber operated by an engine camshaft, and a second exhaust means 11 in the form of a port in the side wall of the cylinder 1B, this port being uncovered during the first part of the exhaust stroke as shown in FIG. 2. This arrangement is particularly advantageous since, as the pressure and temperature of the exhaust gas is high at the time of port uncovering, scavenging at the end of the exhaust cycle is improved, the effective back pressure is reduced, and the pressure pulse delivered to the reactor 5 reduces the need for silencing the exhaust duct leading to the atmosphere. Alternatively, the second exhaust means 11 can be a pressure-operated port which is uncovered by the piston when it is close to bottom dead centre. Such a port can operate against a low pressure. In a further different arrangement, the second exhaust means may be a further poppet valve in the combustion chamber operated by the camshaft. This arrangement can be used in an engine with a cylinder head having four valves for each cylinder as will be described later with respect to FIG. 4.

(2) Nozzle Choking

An exhaust duct from the engine is restricted or choked during the first part of the exhaust stroke, for instance by a nozzle which chokes the flow of gases when sonic gas velocity is achieved at its throat. This creates a pulse of high pressure in the duct which provides recycled exhaust to the reactor 5. The proportion of the exhaust stroke during which the duct is choked increases with engine speed so a variable nozzle can be utilised which may be controlled in accordance with engine speed and/or engine load.

(3) Flow Resistance Balancing

Figure 3:
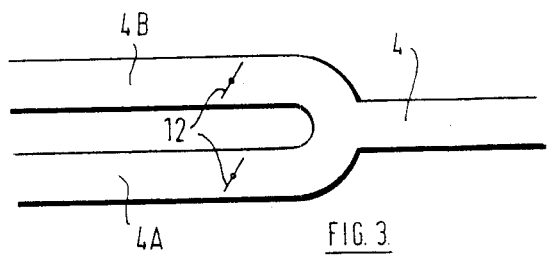

The exhaust gases are divided into two ducts 4A and 4B as illustrated in FIGS. 1 and 3. The exhaust gases divide between the ducts in inverse relationship to the resistance to flow of each duct. As shown in FIG. 3, throttle valves 12, which may be controlled manually or automatically in accordance with engine speed or load, are used to alter the proportion in which the exhaust gases divide between the two ducts 4A and 4B. Alternatively, controlled and adjustable nozzles may be used to restrict the flow in the two ducts.

(4) Split Multi-Cylinder Engine

Figure 5:
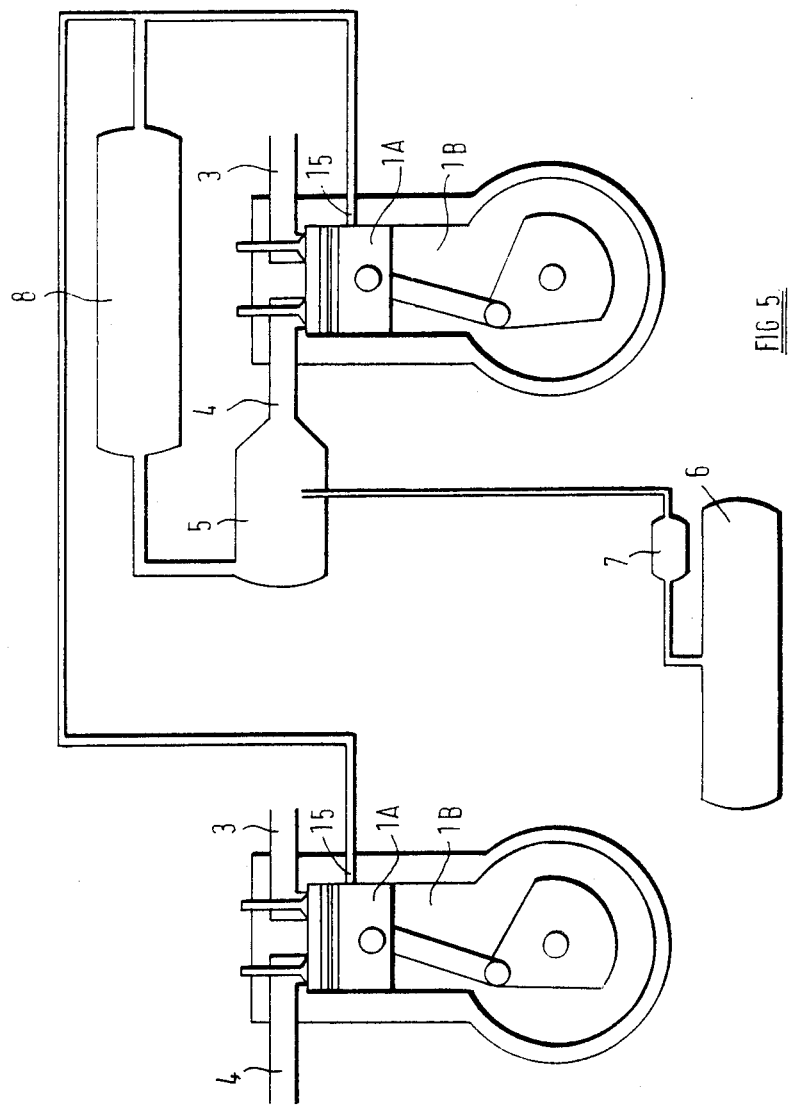
FIG. 5 schematically illustrates a second arrangement of an internal combustion engine according to this invention.

In one arrangement of an engine having a plurality of cylinders, only some of the cylinders 1B need be connected to provide recycled exhaust to the reactor 5 and this is illustrated in FIG. 5. The proportion of exhaust gas recycled is controlled by determining the number of cylinders connected to the reactor 5. Preferably, the cylinders supplying recycled exhaust are run with a stoichiometric mix of reformed fuel and air or with an excess of reformed fuel to prevent oxygen being taken to the reactor 5. Any excess reformed fuel is recycled and therefor not wasted. The other cylinders can be run with a stoichiometric or a lean mix of reformed fuel and air. This method is particularly suitable for engines with pistons in a V-arrangement which are already provided with separate inlet and exhaust manifolds on the two sides of the V.

Figure 4:
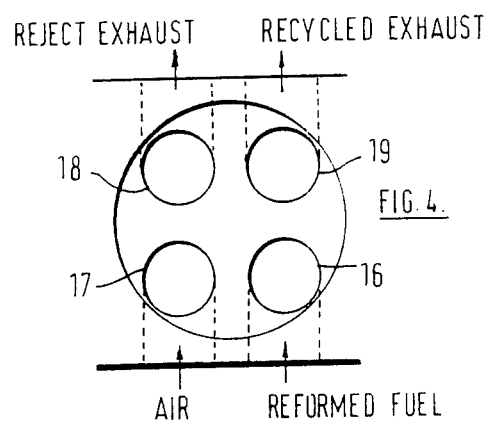
FIG. 4 illustrates the manner in which a cylinder head having four valves per cylinder can be used in an internal combustion engine according to this invention.

It will be appreciated that, in accordance with the invention, where all the cylinders are supplied with reformed gas, the engine takes in air only when an inlet valve 14 is opened during the induction stroke. When the inlet valve 14 is closed and the piston 1A was moved part way down during the induction stroke, reformed fuel is supplied to the cylinder 1B through the means 15 as has been descrbed with reference to FIG. 1. The air and reformed fuel mix with each other during the compression stroke. Alternatively, as shown in FIG. 4, the reformed fuel may be introduced into the cylinder through a poppet valve 16 in the combustion chamber. This arrangement can be used in an engine with a cylinder head having four valves for each cylinder. In addition to valve 16, poppet valves are provided for air (valve 17), for rejecting exhaust gases to atmosphere (valve 18) and for supplying exhaust gases to the reactor 5 (valve 19). A conventional engine with a four valve cylinder head can be used in this arrangement, a camshaft operating the valves to open and close the valves at the correct times e.g. to ensure that at least part of the air is supplied before the supply of reformed fuel for each supply operation or to ensure that no separate air is supplied after the commencement of the supply of reformed fuel.

This method of mixing the reformed fuel with air is particularly advantageous since it can significantly increase the indicated mean effective pressure (IMEP) available and thus increase the power output of the engine. The calorific value of a stoichiometric mixture of reformed fuel and air per unit volume of mixture is lower than that of a petrol-air mixture. However, the calorific value of the stoichiometric mixture per unit volume of air in the mixture is greater than that for a petrol-air mixture. The calorific value for a petrol-air mixture is about 3.54 Mf/m$^3$ air whilst that for mixture of the type described above is about 4.7 Mf/m$^3$ air. This represents a 32.7% improvement in MEP available, ignoring additional pumping work. Advantage can be taken of this as the engine breathes only air on the induction stroke and reformed fuel is then injected into the cylinder at high pressure and high velocity as the piston is near to bottom dead centre. The power increase obtained is particularly noticed at low speed operation of the engine as there is then more time for the reformed fuel and air to mix during the compression stroke. It will be appreciated that an increase in power output can be obtained in this way when any relatively low calorific value fuel is injected under pressure into a cylinder arranged to induct separately air and reformed fuel.

With a combination of separate direct porting of exhaust gas and induction of air into the cylinder, regulation of gas flow into and out of the cylinder can be achieved dynamically as in a two-stroke engine.

A spark ignition engine arranged in the manner described above can be started from cold very easily. When the engine is first turned by a starter motor no reformed fuel is supplied to the engine so unburnt air is recycled through the exhaust duct 4B to the reactor 5. If sufficient fuel is supplied to the reactor 5 and a spark or glow plug provided in the reactor is actuated, a process of partial oxidation will occur in the reactor which will produce a reformed fuel and this can be represented by the reaction:

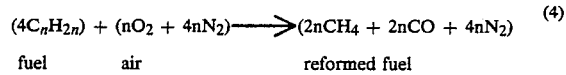
fuel      air      reformed fuel      (4)

This reaction is exothermic and therefore heats the reactor 5. The reformed fuel produced by the reactor 5 is supplied to the engine and burns to produce $CO_2$ and $H_2O$ which are then recycled to the reactor 5 so that the reforming reaction (1) can occur. Eventually, sufficient reformed fuel is produced in the reactor 5 so that no unburnt air is recycled. The reforming reaction (1) thus gradually takes the place of the partial oxidation reaction (4).

The partial oxidation reaction (4) should, of course, be avoided in normal running of the engine as the reformed fuel produced thereby has a lower calorific value than the unreformed fuel. However, the partial oxidation reaction (4) could be reverted to, or used alongside reaction (1), in conditions which might occur where there is insufficient heat in the recycled exhaust gas to maintain the reforming reaction (1).

In order to reduce the power output of the engine when it is not required to operate at full power, it is necessary to reduce the amount of fuel burnt. However, if the fuel is burnt in an excess of air, some oxygen will be taken to the reactor and the partial oxidation reaction (4) described above will occur. This can be avoided if the proportion of exhaust gas recycled to the reactor and the quantity of fuel supplied to the reactor are controlled and adjustable so as to change the proportion of inert gas (mainly nitrogen) in the reformed fuel produced. If the quantity of inert gas in the reformed fuel is increased this will displace much of the intake air and thus reduce the air supply to the engine. The air and excess exhaust gas supply can be fed through the valve normally utilised for supplying air to the engine. The engine can therefore be operated at reduced power output, the oxygen intake of the engine being reduced without throttling the air intake so that the engine will run more efficiently at part-load, since pumping losses, which occur in a conventional spark ignition engine when the air intake is throttled, are avoided.

The engines described above are tolerant to different fuels. Fuels as different as propane and fuel oil can be supplied to the reactor 5 where they are reformed to produce smaller molecules such as CO and $H_2$. The reformed fuel is then mixed with air and burnt in the engine.

As mentioned above, the illustrated engine is a reciprocating spark ignition engine. However, other types of internal combustion engines, e.g. compression ignition engines and rotary engines, may be operated in accordance with the described method. While in FIG. 4 a cylinder head with four valves is illustrated, the invention also includes a cylinder head having three valves there being, in addition to air and exhaust valves either an additional valve for reformed fuel or one for recycling exhaust gases.

I claim:

1. An internal combustion engine having a cylinder, a reaction chamber for receiving a supply of hydrocarbon fuel, means for supplying exhaust gas from the cylinder combustion chamber to the reaction chamber to enable a reaction to take place therein to produce a cracked and reformed fuel, means for the supply of air to the combustion chamber and separate means for the supply thereto of the reformed fuel from the reaction chamber, and means for controlling flow of air and reformed fuel into the combustion chamber, so that at least part of the air enters the combustion chamber before the reformed fuel begins to be introduced into the combustion chamber.

2. An internal combustion engine according to claim 1 wherein there is provided in the head of the cylinder a valve for the supply of cracked and reformed hydrocarbon fuel and a separate valve on the said head for the supply of air.

3. An internal combustion engine according to claim 1 having a valve for the supply of air, said valve opening into the combustion chamber adjacent the point at which the induction stroke commences and a separate means for the supply of cracked and reformed fuel opening into the combustion chamber at a point towards the point at which the induction stroke finishes.

4. An internal combustion engine according to claim 1 wherein the means for supply of air and the means for the supply of cracked and reformed hydrocarbon fuel are provided with means for actuating them whereby air supply means is actuated prior to the actuation of the reformed hydrocarbon fuel supply means.

5. An internal combustion engine according to claim 1 wherein means are provided for closing the means for the supply of air before the opening of the means for the supply of reformed hydrocarbon fuel 6. An internal combustion engine according to claim 1 wherein means are provided for the supply to the engine of reformed fuel under pressure.

7. An internal combusion engine according to claim 1 wherein means are provided in the cylinder to extract exhaust gas from the combustion chamber, said means being connected to the means for supplying exhaust gas to the reaction chamber, a second means being provided in the cylinder for rejection of the exhaust gas.

8. An internal combustion engine according to claim 1 wherein the means for supplying exhaust gas from the cylinder combustion space and the reaction chamber comprises a duct having a restricting means provided therein operable to cause a restriction in the duct for at least part of an exhaust stroke.

9. An internal combustion engine according to claim 8 wherein the duct is divided into two parts, one part being provided for the passage of rejected exhaust gas and the other part being provided for the supply of exhaust gas to the reaction chamber.

10. An internal combustion engine according to claim 1 wherein the engine is provided with a plurality of cylinders some only having means for the supply of air to the combustion space and separate means for the supply of cracked and reformed fuel from the reaction chamber.

11. A method of operating an internal combustion engine including the steps of; recycling at least a portion of exhaust gs produced in an engine cylinder combustion chamber; reacting the recycled exhaust gas with a hydrocarbon fuel to produce a reformed fuel by cracking molecules of the hydrocarbon fuel; feeding the reformed fuel to a combustion chamber during an induction stroke; and feeding an air supply to the combustion chamber; the reformed fuel and air being fed to the combustion chamber separately, and being timed to occur so that at least part of the air is supplied before introduction of the reformed fuel begins, for each supply operation.

12. A method according to claim 11 wherein the air supply and the reformed fuel supply are fed through the head end of the cylinder into the combustion chamber.

13. A method according to claim 11 wherein the air supply is introduced into the combustion chamber at a point adjacent the beginning of the induction stroke and the reformed fule supply is introduced into the combustion chamber at a point towards the end of the induction stroke.

14. A method according to claim 11 wherein no separate air is supplied after the commencement of the supply of reformed fuel.

15. A method according to claim 11 wherein the reformed fuel is pressure charged into the engine.

16. A method acccording to claim 11 wherein the exhaust gas flows partly through one cylinder port to extract gas for recycling and the remainder is extracted by operation of a separate cylinder exhaust port.

17. A method according to claim 11 wherein the exhaust gas is caused to flow through an exhaust duct leading from the cyclinder, the flow in the said duct being restricted for at least part of the exhaust stroke and withdrawing the exhaust gas during restriction to supply it for recycling.

18. A method according to claim 11 wherein the exhaust gas flow is divided between two exhaust ducts, exhaust from one duct being recycled while exhaust gas from the other duct is rejected.

19. A method of operating an internal combustion engine according to claim 11 wherein less than all of the cylinders supply exhaust gas to produce a reformed fuel.

20. A method according to claim 11 wherein the engine is provided with a plurality of cylinders some only of the cylinders having a supply of air separate from a supply of reformed fuel.

21. A method of operating an internal combustion engine according to claim 20 wherein some of the cylinders are supplied with an untreated hydrocarbon fuel.

22. A method of operating an internal combustion engine according to claim 11 wherein the respective amounts of hydrocarbon fuel and recycled exhaust gas utilised to produce a reformed fuel are controlled and adjustable.

23. A method of operating an internal combustion engine according to claim 22 wherein the adjustment operates to reduce the power output.

* * * * *